United States Patent
Geier et al.

(10) Patent No.: US 6,693,053 B2
(45) Date of Patent: *Feb. 17, 2004

(54) GLASS AND GLASS POWDER MIXTURE AND USE THEREOF FOR THE PRODUCTION OF A GLASS CERAMIC

(75) Inventors: Heinz Geier, Leonberg (DE); Rudolf Pollner, Bamberg (DE); Ulrich Eisele, Stuttgart (DE); Peter Wange, Jena (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/980,896

(22) PCT Filed: Feb. 24, 2001

(86) PCT No.: PCT/DE01/00722

§ 371 (c)(1),
(2), (4) Date: Mar. 22, 2002

(87) PCT Pub. No.: WO01/74728

PCT Pub. Date: Oct. 11, 2001

(65) Prior Publication Data

US 2002/0137619 A1 Sep. 26, 2002

(30) Foreign Application Priority Data

Apr. 1, 2000 (DE) .......................................... 100 16 414

(51) Int. Cl.[7] .......................... C03C 10/04; C03C 8/16; C03C 8/18; C03C 8/22; H01B 1/16
(52) U.S. Cl. .............................. 501/5; 501/8; 501/15; 501/16; 501/17; 501/19; 501/20; 501/21; 313/130; 313/135; 252/513; 252/514; 252/520.21; 252/520.22
(58) Field of Search ............................ 501/5, 8, 15, 17, 501/19, 20, 21, 70, 73, 16; 313/130, 135; 252/513, 514, 520.21, 520.22

(56) References Cited

U.S. PATENT DOCUMENTS

| | | | | | |
|---|---|---|---|---|---|
| 3,931,055 | A | * | 1/1976 | Friese | .................... 525/503 |
| 4,187,115 | A | * | 2/1980 | Reade | .......................... 65/33 |
| 4,853,349 | A | * | 8/1989 | Martin | ........................ 501/8 |
| 5,645,765 | A | * | 7/1997 | Asada et al. | ................ 252/518 |
| 6,348,424 | B1 | * | 2/2002 | Hazeyama et al. | .......... 501/5 |
| 6,426,586 | B1 | * | 7/2002 | Young et al. | ............... 313/130 |

FOREIGN PATENT DOCUMENTS

| | | |
|---|---|---|
| DE | 22 45 403 | 3/1974 |
| DE | 196 51 454 | 6/1998 |
| DE | 197 08 105 | 9/1998 |
| JP | 4-275976 | * 10/1992 |
| WO | 98/38138 | * 9/1998 |

OTHER PUBLICATIONS

Duan, R, *Effect of Changing Ti02 Content on Structure and Crystallization of CaO–A1203–SiO2 System Glasses*, Journal of the European Ceramic Society, GB, Elsevier Science Publishers, Nov. 1, 1998, vol. 18, No. 12 (pp. 1729–1735) no month.

Villegas, MA, *Propiedades Y Characterization Estructural De Vidrios Del Sistema CAO–TIO2–AL2O3–SIO2*, Boletin De La Sociedad Espanola De Ceramica Y Vidrio, Madrid, 1995, vol. 34, No. 3 (pp. 135–139) no month.

* cited by examiner

Primary Examiner—Karl Group
(74) Attorney, Agent, or Firm—Kenyon & Kenyon

(57) ABSTRACT

A glass or glass powder is fused from a starting mixture containing approximately 38 wt % to 48 wt % $SO_2$, 15 wt % to 19 wt % $Al_2O_3$, 4.5 wt % to 11 wt % $TiO_2$, 0 wt % to 1.5 wt % $Na_2O$, 0 wt % to 1.5 wt % $K_2O$ and 23 wt % to 30 wt % CaO. In addition, a glass powder mixture includes two glass powders, a carbon black powder and an organic binder, the first glass powder having a mean particle size of approximately 150 μm to 250 μm, the second glass powder having a mean particle size of less than approximately 100 μm, which may be 10 μm to 70 μm. The glass or glass powder mixture is suitable for producing a glass ceramic, such as that used as a resistor seal and/or a gas-tight glass ceramic solder in a spark plug.

22 Claims, No Drawings

GLASS AND GLASS POWDER MIXTURE AND USE THEREOF FOR THE PRODUCTION OF A GLASS CERAMIC

FIELD OF THE INVENTION

The present invention relates to a glass, in particular a glass powder and a glass powder mixture, as well as their use to produce a glass ceramic, which may be used in particular as a resistor seal or ceramic solder in a spark plug.

BACKGROUND INFORMATION

German Published Patent Application No. 196 51 454 refers to a spark plug including an electrode connected across a terminal stud to an ignition line, with a resistor made of glass or a glass ceramic material having a high thermal stability being arranged between the electrode and the ignition line. A glass powder used as a starting material to produce the burn-off resistor may be metallized at the surface in a currentless operation.

The insulator base of a spark plug having a platinum center electrode develops temperatures of up to 950° C. Because of these temperatures, options should be developed for contacting the center electrode, for producing a protruding burn-off resistor and for contacting the protruding burn-off resistor so that all these elements may tolerate an operating temperature of at least approximately 900° C. for more than 2000 h. At the same time, the temperature of the spark plug during production should not exceed 950° C. to prevent oxidation or deformation of the stud material.

In such spark plugs, the center electrode may be connected to the contact pin by diffusion welding. However, this may involve the problem of unwanted stresses and defects, since the coefficient of thermal expansion of the contact pin material may not be adequately adapted to the surrounding insulator.

SUMMARY OF THE INVENTION

An object of an exemplary embodiment of the present invention is directed to providing a glass and a glass powder mixture produced using the glass, and which is suitable for producing a thermally stable glass ceramic with high voltage strength at low process temperatures. This glass ceramic should be suitable for use as a resistor seal and/or as a gas-tight ceramic solder in a spark plug.

The exemplary glass and glass powder mixtures may be used to produce a glass ceramic with a high voltage strength at room temperature up to 20 kV/mm or at 800° C. up to 10 kV/mm. In addition, the coefficient of thermal expansion of this glass ceramic is approximately 6 ppm/K at between approximately 100° C. and approximately 200° C. and approximately 9 ppm/K at between approximately 700° C. and approximately 800° C., so that the glass may be suitable like aluminum oxide insulator material for use in spark plugs.

In addition, an exemplary glass according the present invention has a softening temperature $E_g$ (determined dilatometrically) of approximately 720° C. to 820° C., so that glass ceramic seals may be produced at temperatures of 850° C. and 950° C. Further, the refractory phases anorthite, wollastonite and titanite may crystallize out in the process, resulting in a glass ceramic that may be thermally stable to temperatures above 1000° C.

An exemplary glass powder mixture according to the present invention may be used to produce a glass ceramic in the form of electrically conducting glass ceramic solder, which may be suitable for contacting a center electrode or a burn-off resistor in a spark plug. This conductive ceramic solder may be gas-tight and resistant to oxidation.

The glass ceramic produced from the glass or glass powder according to the present invention may be used to produce a resistor seal having a high thermal stability.

Therefore, the exemplary glass and glass powder mixtures according the present invention, may be used to produce glass ceramic seals, including those needed in the production of spark plugs that have a higher thermal stability at given process temperatures when compared to other methods.

Good high voltage strength and process temperatures may be realized if, for example, the glass according to the present invention includes a glass powder fused from a starting mixture containing 43 wt % to 48 wt % $SiO_2$, 16.5 wt % to 18 wt % $Al_2O_3$, 6 wt % to 10.5 wt % $TiO_2$, 0.3 wt % to 1.2 wt % $Na_2O$, 0.3 wt % to 1.2 wt % $K_2O$ and 24.5 wt % to 28.5 wt % CaO.

Another exemplary embodiment of the present invention is believed to have advantages with regard to high voltage strength, process temperature and development of the refractory phases which may occur in a heat treatment of the glass powder due to crystallization in at least some areas. The glass composition is believed to have good thermal stability and a coefficient of thermal expansion which may be adapted well to that of aluminum oxide.

In addition, the exemplary glass according to the present invention may be suitable for producing a glass ceramic seal having a low resistance, by providing the glass with a surface metallization before the glass powder is fused and converted into a glass ceramic. The surface metallization may include a metal having a high thermal stability such as platinum, palladium, nickel, tungsten or an alloy of these materials at least partially or at least in some areas. The surface metallization may be produced by a currentless method, such as that referred to in German Published Patent Application No. 196 51 454.

Zirconium dioxide or mullite may also be added to the glass powder mixture to adjust the coefficient of thermal expansion of the glass ceramic ultimately obtained.

DETAILED DESCRIPTION

An exemplary glass is first fused in an available manner from a starting mixture, which may include a composition according to the table below. To do so, powdered forms of the individual components of the starting mixture are mixed (e.g., for the various exemplary glasses indicated as embodiments in the table below) and then may be fused at temperatures of typically more than approximately 1500°C. to form a glass.

| Components of the starting mixture (wt %) | Glass 1 | Glass 2 | Glass 3 | Glass 4 | Glass 5 |
|---|---|---|---|---|---|
| $SiO_2$ | 46.5 | 47.9 | 45.6 | 45.0 | 45.0 |
| $Al_2O_3$ | 17.2 | 17.7 | 16.9 | 17.0 | 17.0 |
| CaO | 25.3 | 26.1 | 24.8 | 28.0 | 28.0 |
| $Na_2O$ | 0.5 | 1.0 | 1.0 | 0.5 | 0 |
| $K_2O$ | 0.5 | 1.0 | 1.0 | 0.5 | 0 |
| $TiO_2$ | 10.1 | 6.2 | 9.8 | 9.0 | 9.0 |
| $Li_2O$ | 0 | 0 | 1.0 | 0 | 1.0 |

-continued

| Components of the starting mixture (wt %) | Glass 1 | Glass 2 | Glass 3 | Glass 4 | Glass 5 |
|---|---|---|---|---|---|
| $\alpha \times 10^{-6}$ (K$^{-1}$) | 7.5 | 8.0 | 8.8 | 8.3 | 8.4 |
| $T_g$ (° C.) | 758 | 743 | 678 | 753 | 700 |
| $E_g$ (° C.) | 792 | 775 | 717 | 786 | 742 |

The information in the preceding table concerning the composition of the starting mixture is given in percent by weight (wt %). In addition, the respective coefficient of thermal expansion α in the temperature range from between 100° C. and 500° C. is also given for the fused glass. In addition to the components indicated above in the various starting mixtures, other glass components such as MgO, BaO, ZrO$_2$ and Fe$_2$O$_3$ may also be present in minor amounts, but their total amount should not exceed approximately 2 percent by weight.

The term $T_g$ refers to the measured glass transition temperature of the resulting glass, while $E_g$ is the dilatometric softening point.

Glass 4 is an exemplary embodiment with regard to the properties of the resulting glass in the preceding table.

The glass obtained after melting may then be milled to form a glass powder, which may be used, for example, to form a glass ceramic resistor seal having a high resistance or a glass ceramic solder having a low resistance for use in a spark plug.

To do so, the glass powder may be first processed in the manner referred to in German Published Patent Application No. 196 51 454 and converted to a glass ceramic at a process temperature of approximately 850° C. to 950° C., whereupon, the refractory phases anorthite, wollastonite and titanite may crystallize out, resulting in a glass ceramic that may be thermally stable up to temperatures above 1000° C. The electric resistance of such a resistor seal, in the form of a burn-off resistor in a spark plug, may be more than 1 kΩ.

To obtain the electrically conducting glass ceramic solder from the glass powder produced by the exemplary method described above, the glass powder may also be provided with a surface metallization, such as the surface metallization referred to in German Published Patent Application No. 196 51 454. To do so, after seeding, a currentless surface metallization of the glass powder may be performed with a metal that is stable at high temperatures, such as platinum, palladium, nickel, tungsten or an alloy of these materials. The thickness of the surface metallization may be between 0.5 nm and 10 nm, and the metallizing glass powder may have a mean particle size of less than 250 μm, and which may be between 10 μm and 70 μm. The glass powder provided with the surface metallization may then be melted again at a process temperature of approximately 850° C. to 950° C. to form a glass ceramic.

The resulting glass ceramic may be suitable as a glass ceramic solder, which may be used, for example, to bond a metallic contact pin or a stud in a spark plug to a glass ceramic burn-off resistor produced in the manner described above. The electric conductivity of the glass ceramic solder depends upon the surface metallization of the powder used, which forms in fusion a metal phase, in the form of metal paths (which carry the electric conductivity of the glass ceramic solder) which are embedded in a glass ceramic matrix and which may be in the form of a network.

Another exemplary embodiment for producing an electrically conductive glass ceramic solder uses a mixture of two different glass powders, each powder being milled from one of the glasses described above, the first glass powder having a mean particle size of approximately 50 μm to 250 μm and the second glass powder having a mean particle size of less than approximately 100 μm, which may be 10 μm to 70 μm. In addition, a carbon black powder having a mean particle size of approximately 200 nm to 2 μm, which may be 400 nm to 600 nm, is provided, and an organic binder is prepared from carboxymethylcellulose and dextrin to which water is added as a solvent. Also, a zirconium dioxide powder having a mean particle size of less than approximately 100 μm and a mullite powder having a mean particle size of less than approximately 100 μm may also be provided. The first glass powder is mixed with the second glass powder, the carbon black powder, the binder, the zirconium dioxide powder and the mullite powder. The mixture may be prepared to contain an amount of approximately 40 wt % to 58 wt % of the first glass powder, an amount of approximately 3 wt % to 13 wt % of the second glass powder, an amount of approximately 0.9 wt % to 2.5 wt % of the carbon black powder, an amount of approximately 10 wt % to 37 wt % of the zirconium dioxide powder, an amount of approximately 8 wt % to 13 wt % of the mullite powder, and an amount of approximately 0.6 wt % to 4 wt % of the binder, all amounts in wt % being based on a solvent-free glass powder mixture. The total amount of solvent in the resulting glass powder mixture may be approximately 12 percent by volume to 40 percent by volume, and may be 22 percent by volume to 37 percent by volume. After mixing the components indicated above, a glass powder mixture results, in which the powder particles of the first glass powder may be provided at least largely with a compound of the other components.

The resulting glass powder mixture may then be subjected to a heat treatment at a process temperature of approximately 850° C. to 950° C., whereupon the glass powders may crystallize in at least some areas or partially, and the refractory phases anorthite, wollastonite and titanite are formed again.

Thus, a glass ceramic in the form of a seal may be formed, and which contains a glass ceramic matrix including a carbon phase in the form of a network embedded in a matrix and formed by pyrolysis of the carbon black powder and organic binder, which may be added to the glass powder mixture.

Such a glass ceramic may also be used as a glass ceramic solder in production of a spark plug.

What is claimed is:

1. A glass comprising:
a glass powder fused from a starting mixture including approximately 38 percent by weight to 48 percent by weight of SiO$_2$, approximately 15 percent by weight to 19 percent by weight of Al$_2$O$_3$, approximately 4.5 percent by weight to 11 percent by weight of TiO$_2$, and approximately 23 percent by weight to 30 percent by weight of CaO.

2. The glass of claim 1, wherein the starting mixture includes at least one of alkali metal oxide, lithium oxide, potassium oxide, and sodium oxide, each one being in an amount up to approximately 1.5 percent by weight.

3. The glass of claim 1, herein the starting mixture includes approximately 43 percent by weight to 48 percent by weight of the SiO$_2$, approximately 16.5 percent by weight to 18 percent by weight of the Al$_2$O$_3$, approximately 6 percent by weight to 10.5 percent by weight of the TiO$_2$, approximately 0.3 percent by weight to 1.2 percent by weight of Na$_2$O, approximately 0.3 percent by weight to 1.2 percent by weight of K$_2$O, and approximately 24.5 percent by weight to 28.5 percent by weight of the CaO.

4. The glass of claim 1, wherein the starting mixture includes approximately 45 percent by weight of the SiO$_2$, approximately 17 percent by weight of the Al$_2$O$_3$, approximately 9 percent by weight of the TiO$_2$, approximately 0.5 percent by weight of Na$_2$O, approximately 0.5 percent by weight of K$_2$O, and approximately 28 percent by weight of the CaO.

5. The glass of claim 1, wherein the glass powder is at least partially provided in at least some areas with a surface metallization, the metallization including at least one metal selected from the group consisting of platinum, palladium, nickel, tungsten and an alloy of these materials.

6. The glass of claim 5, wherein the glass powder includes a mean particle size of less than approximately 250 μm, and a thickness of the surface metallization is approximately 0.5 nm to 10 nm.

7. A glass powder mixture comprising:
   a carbon black powder;
   an organic binder;
   a first glass powder including a mean particle size of approximately 150 μm to 250 μm; and
   a second glass powder including a mean particle size of less than approximately 100 μm;
   wherein each of the first glass powder and the second glass powder includes a glass powder fused from a starting mixture including approximately 38 percent by weight to 48 percent by weight of SiO$_2$, approximately 15 percent by weight to 19 percent by weight of Al$_2$O$_3$, approximately 4.5 percent by weight to 11 percent by weight of TiO$_2$, and approximately 23 percent by weight to 30 percent by weight of CaO.

8. The glass powder mixture of claim 7, wherein the carbon black powder includes a mean particle size of approximately 200 nm to 2 μm.

9. The glass powder mixture of claim 7, wherein the organic binder includes carboxymethylcellulose and dextrin, and water is added to the organic binder as a solvent.

10. The glass powder mixture of claim 7, wherein the glass powder mixture includes zirconium dioxide having a mean particle size of less than approximately 100 μm.

11. The glass powder mixture of claim 7, wherein the glass powder mixture includes mullite.

12. The glass powder mixture of claim 7, wherein the glass powder mixture includes approximately 40 percent by weight to 58 percent by weight of the first glass powder, approximately 3 percent by weight to 13 percent by weight of the second glass powder, approximately 0.9 percent by weight to 2.5 percent by weight of the carbon black powder, approximately 10 percent by weight to 37 percent by weight of zirconium dioxide, approximately 8 percent by weight to 13 percent by weight of mullite, and approximately 0.6 percent by weight to 4 percent by weight of the organic binder, all amounts in percent by weight being based on a solvent-free glass powder mixture.

13. The glass powder mixture of claim 12, wherein the glass powder mixture includes approximately 12 percent by volume to 40 percent by volume of a solvent.

14. A method for using a glass powder mixture, comprising:
   fusing a starting mixture including approximately 38 percent by weight to 48 percent by weight of SiO$_2$, approximately 15 percent by weight to 19 percent by weight of Al$_2$O$_3$, approximately 4.5 percent by weight to 11 percent by weight of TiO$_2$, and approximately 23 percent by weight to 30 percent by weight of CaO to form a glass powder, wherein the glass power is at least partially provided in at least some areas with a surface metallization, the metallization including at least one metal selected from the group consisting of platinum, palladium, nickel, tungsten and an alloy of these materials; and
   producing a glass ceramic from the glass powder.

15. The method of claim 14, wherein the glass ceramic includes at least one of a resistor seal and a gas-tight glass ceramic solder for use in a spark plug.

16. A method for using a glass powder mixture, comprising:
   fusing a starting mixture including approximately 38 percent by weight to 48 percent by weight of SiO$_2$, approximately 15 percent by weight to 19 percent by weight of Al$_2$O$_3$, approximately 4.5 percent by weight to 11 percent by weight of TiO$_2$, and approximately 23 percent by weight to 30 percent by weight of CaO to form a first glass powder, the first glass powder being formed to have a mean particle size of approximately 150μ to 250μ;
   fusing a starting mixture including approximately 38 percent by weight to 48 percent by weight of SiO$_2$, approximately 15 percent by weight to 19 percent by weight of Al$_2$O$_3$, approximately 4.5 percent by weight to 11 percent by weight of TiO$_2$, and approximately 23 percent by weight to 30 percent by weight of CaO to form a second glass powder, the second glass powder being formed to have a mean particle size of less than approximately 100 μm;
   producing a mixture comprising and producing a glass ceramic from said mixture a carbon black powder, an organic binder, the first glass powder, and the second glass powder.

17. The glass of claim 6, wherein the mean particle size is approximately 10 μm to 70 μm.

18. The glass powder mixture of claim 7, wherein the starting mixture of each of the first glass powder and the second glass powder includes at least one of alkali metal oxide, lithium oxide, potassium oxide, and sodium oxide, each one being in an amount up to approximately 1.5 percent by weight.

19. The glass powder mixture of claim 7, wherein the starting mixture of each of the first glass powder and the second glass powder includes approximately 43 percent by weight to 48 percent by weight of the SiO$_2$, approximately 16.5 percent by weight to 18 percent by weight of the Al$_2$O$_3$, approximately 6 percent by weight to 10.5 percent by weight of the TiO$_2$, approximately 0.3 percent by weight to 1.2 percent by weight of Na$_2$O, approximately 0.3 percent by weight to 1.2 percent by weight of K$_2$O, and approximately 24.5 percent by weight to 28.5 percent by weight of the CaO.

20. The glass powder mixture of claim 7, wherein the starting mixture of each of the first glass powder and the second glass powder includes approximately 45 percent by weight of the SiO$_2$, approximately 17 percent by weight of the Al$_2$O$_3$, approximately 9 percent by weight of the TiO$_2$, approximately 0.5 percent by weight of Na$_2$O, approximately 0.5 percent by weight of K$_2$O, and approximately 28 percent by weight of the CaO.

21. The glass powder mixture of claim 8, wherein the mean particle size of the carbon black powder is approximately 400 nm to 600 nm.

22. The glass powder mixture of claim 13, wherein the amount of the solvent is approximately 22 percent by volume to 37 percent by volume.

* * * * *

UNITED STATES PATENT AND TRADEMARK OFFICE
CERTIFICATE OF CORRECTION

PATENT NO. : 6,693,053 B2 Page 1 of 1
DATED : February 17, 2004
INVENTOR(S) : Heinz Geier et al.

It is certified that error appears in the above-identified patent and that said Letters Patent is hereby corrected as shown below:

Column 5,
Line 13, change "group consisting of platinum" to -- group consisting of a metal having a high thermal stability, platinum... --.

Column 6,
Line 3, change "group consisting of platinum" to -- group consisting of a metal having a high thermal stability, platinum... --.
Lines 31-34, change "producing a mixture...the second glass powder." to -- producing a glass ceramic using a carbon black powder, an organic binder, the first glass powder, and the second glass powder. --.
Lines 31 and 32, delete "and producing a glass ceramic from said mixture".
Line 34, change "glass powder." to -- glass powder and producing a glass ceramic from said mixture. --.

Signed and Sealed this

Twenty-third Day of August, 2005

JON W. DUDAS
*Director of the United States Patent and Trademark Office*